(12) United States Patent
Hall

(10) Patent No.: US 9,977,428 B2
(45) Date of Patent: May 22, 2018

(54) AUGMENTATIVE CONTROL OF DRONES

(71) Applicant: AT&T INTELLECTUAL PROPERTY I, LP, Atlanta, GA (US)

(72) Inventor: Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 93 days.

(21) Appl. No.: 15/139,001

(22) Filed: Apr. 26, 2016

(65) Prior Publication Data

US 2017/0308085 A1    Oct. 26, 2017

(51) Int. Cl.
*G05D 1/00* (2006.01)
*G08G 5/00* (2006.01)
*B64C 39/02* (2006.01)

(52) U.S. Cl.
CPC ......... *G05D 1/0088* (2013.01); *B64C 39/024* (2013.01); *G08G 5/006* (2013.01); *G08G 5/0069* (2013.01); *B64C 2201/141* (2013.01); *B64C 2201/146* (2013.01)

(58) Field of Classification Search
CPC .... G05D 1/0088; G08G 5/006; G08G 5/0069; B64C 39/024; B64C 2201/141; B64C 2201/146
See application file for complete search history.

(56) References Cited

U.S. PATENT DOCUMENTS

| | | | |
|---|---|---|---|
| 7,225,063 B2 | 5/2007 | Tart et al. | |
| 7,379,795 B2 | 5/2008 | Arnouse | |
| 7,737,878 B2 | 6/2010 | van Tooren et al. | |
| 7,818,099 B2 | 10/2010 | Kemp | |
| 8,521,339 B2 | 8/2013 | Gariepy et al. | |
| 8,838,289 B2 | 9/2014 | Margolin | |
| 9,317,036 B2 | 4/2016 | Wang et al. | |
| 2003/0055540 A1 | 3/2003 | Hansen | |
| 2005/0075763 A1 | 4/2005 | Brigode | |
| 2007/0018052 A1 | 1/2007 | Eriksson | |
| 2008/0051947 A1 | 2/2008 | Kemp | |
| 2008/0183344 A1 | 7/2008 | Doyen et al. | |
| 2014/0018979 A1 | 1/2014 | Goossen et al. | |
| 2014/0163852 A1 | 6/2014 | Borri et al. | |
| 2015/0339931 A1 | 11/2015 | Yu et al. | |

(Continued)

FOREIGN PATENT DOCUMENTS

WO    WO 2016/006956 A1    1/2016

OTHER PUBLICATIONS

Harris; "US testing an 'air traffic control system' for drones"; The Guardian; Nov. 26, 2015; 4 pages.

(Continued)

*Primary Examiner* — Michael J Zanelli
(74) *Attorney, Agent, or Firm* — Baker & Hostetler LLP

(57) ABSTRACT

A method may include monitoring location information associated with a drone. The method may also include comparing the location information with an authorized zone. The method may also include, based on the comparison, determining a violation by the drone of a rule associated with the authorized zone. The method may include, in response to the violation, augmenting control of the drone to alter operation of the drone. The location information may include at least one of a current or predicted future location of the drone.

18 Claims, 11 Drawing Sheets

(56) References Cited

U.S. PATENT DOCUMENTS

| | | |
|---|---|---|
| 2015/0348424 A1 | 12/2015 | Duffy et al. |
| 2016/0005318 A1 | 1/2016 | Wang et al. |
| 2016/0189549 A1* | 6/2016 | Marcus ................ G08G 5/0034 701/3 |
| 2016/0240087 A1* | 8/2016 | Kube .................... G08G 5/006 |
| 2016/0282861 A1* | 9/2016 | Golden ................ B64C 39/024 |
| 2016/0285863 A1* | 9/2016 | Canavor ............. H04L 63/0823 |
| 2017/0092138 A1* | 3/2017 | Trundle ............... B64C 39/024 |
| 2017/0103659 A1* | 4/2017 | Jin ......................... G08G 5/006 |

OTHER PUBLICATIONS

Boselli et al.; "ASPECTS"; Team 2 Midway Design Review Report; 6 pages; http://www.ecs.umass.edu/ece/sdp/sdp16/team02/MidwayReport.pdf; accessed Apr. 28, 2016.

\* cited by examiner

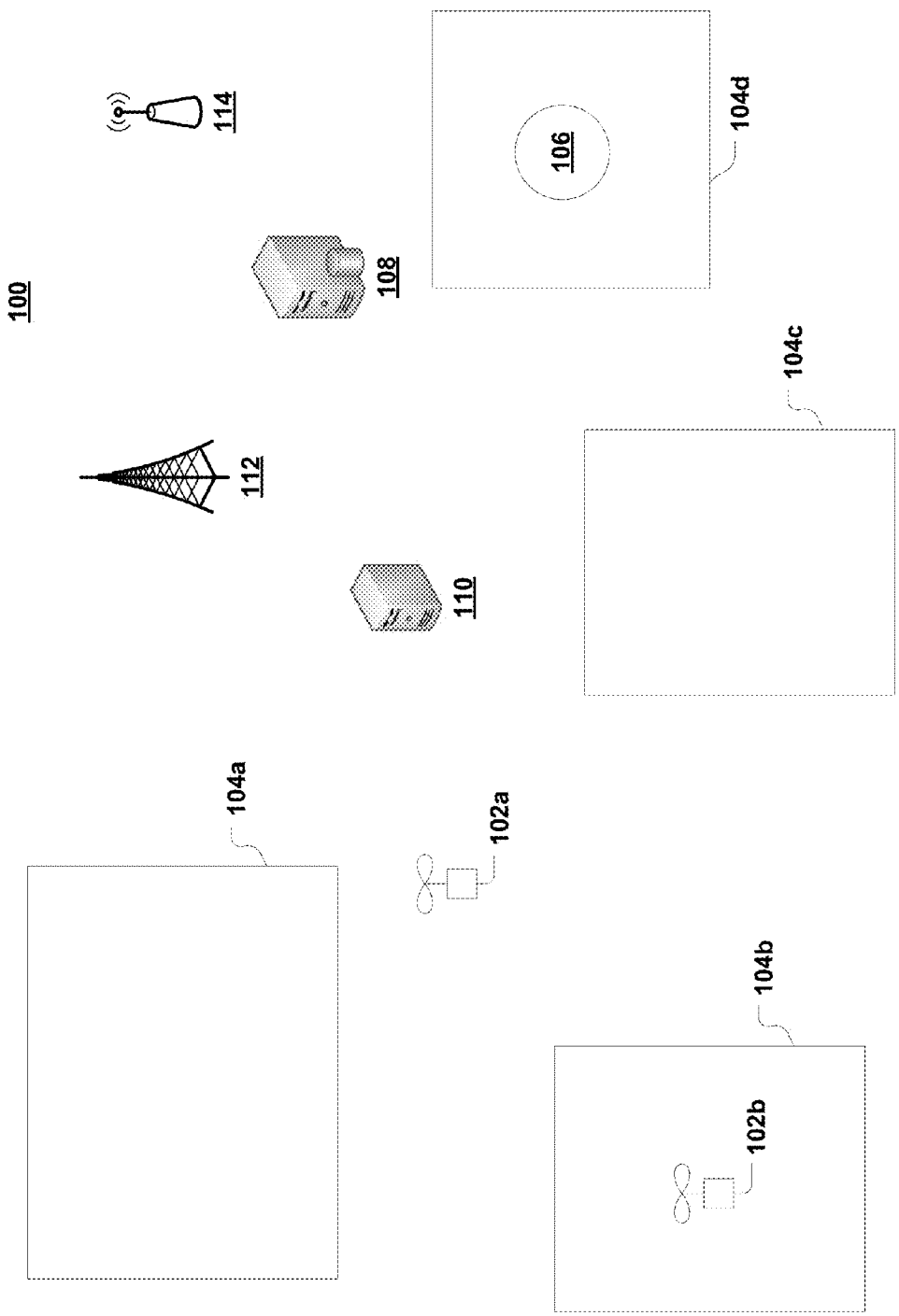

AUGMENTATIVE CONTROL OF DRONES

TECHNICAL FIELD

The technical field generally relates to remote control of unmanned vehicles and, more specifically, to systems and methods for augmenting control of unmanned vehicles based on geographic zones.

BACKGROUND

Drones, including unmanned flying devices, have numerous commercial applications, including use by retailers to deliver goods, which may decrease delivery costs associated with trucks and drivers, use by consumers to capture video and image data, including video of athletic and other events, and use by news agencies to capture data related to traffic and other events, and use by news agencies to capture data related to traffic and other news situations. However, drones also present concerns of dangers and other pitfalls.

For example, drones pose a risk of interfering with commercial and emergency aviation, such as circumstances in which drones are operating in or near flight paths. As another example, drones may cause a firefighting aircraft to abort its mission due to drones improperly flying too close to a forest fire. Drones can also be a danger to people and things on the ground. For example, a drone used to capture a skiing event narrowly missed a skier on the course when it crashed. Drones also threaten privacy invasion on a mass-consumer scale. For example, camera-equipped drones may capture video of people in otherwise private settings.

Today, both technological and legal factors restrict what safety mechanisms can be achieved and what drone and drone-operator behavior is allowed. For example, the Federal Aviation Administration (FAA) requires drones to operate within line-of-sight of the person controlling the drone. The FAA also requires registration of drones, presumably in part so that otherwise-anonymous drones can be traced back to their owners. This identification process only works if the misbehaving drone is captured. Otherwise, such as in the firefighting example, if the offending drone operators are unknown, enforcement of operator rules and institution of consequences for violating the operator rules may be impossible.

Thus, there is a need in the art for systems and methods that allow drones to be safely operated at scale, with secure command and control among legitimate stake holders, such as the drone operator, FAA, law enforcement, private property owners, and private citizens.

SUMMARY

The disclosed systems and methods may allow for augmentative control of unmanned vehicles. For example, augmentative control may override, augment, or change normal control of an unmanned vehicle based upon a geographic zone the unmanned vehicle is located within, is headed towards, or the like.

The present disclosure is directed to a method. A method may include monitoring location information associated with a drone. The method may also include comparing the location information with an authorized zone. The method may also include, based on the comparison, determining a violation by the drone of a rule associated with the authorized zone. The method may include, in response to the violation, augmenting control of the drone to alter operation of the drone. The location information may include at least one of a current or predicted future location of the drone.

The present disclosure is also directed to a drone. The drone may include a processor and memory communicatively coupled to the processor. The memory may store executable instructions that cause the processor to effectuate operations. The operations may include operating flight of the drone using a drone operation controller and monitoring location information of the drone. The operations may include comparing the location information with an authorized zone and, based on the comparison, determining a violation by the drone of a rule associated with the authorized zone. The operations may include, in response to the violation, overriding the drone operation controller to alter operation of the drone. The location information may include at least one of a current or predicted future location of the drone.

The present disclosure is also directed to a method that may include receiving, via a first network, a zone declaration. The zone declaration may include a definition of a zone and a digital signature. The method may include determining that the zone declaration is authorized based on the digital signature indicating a known party. The method may also include adding the zone to a list of authorized zones. The method may include relaying the zone declaration via a second network, wherein the second network differs from the first network.

BRIEF DESCRIPTION OF THE DRAWINGS

Aspects of the herein described telecommunications network and systems and methods for augmentative control of drones are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 1 illustrates an exemplary area of interest whose signal strength may be mapped.

DETAILED DESCRIPTION

Figure 2A:
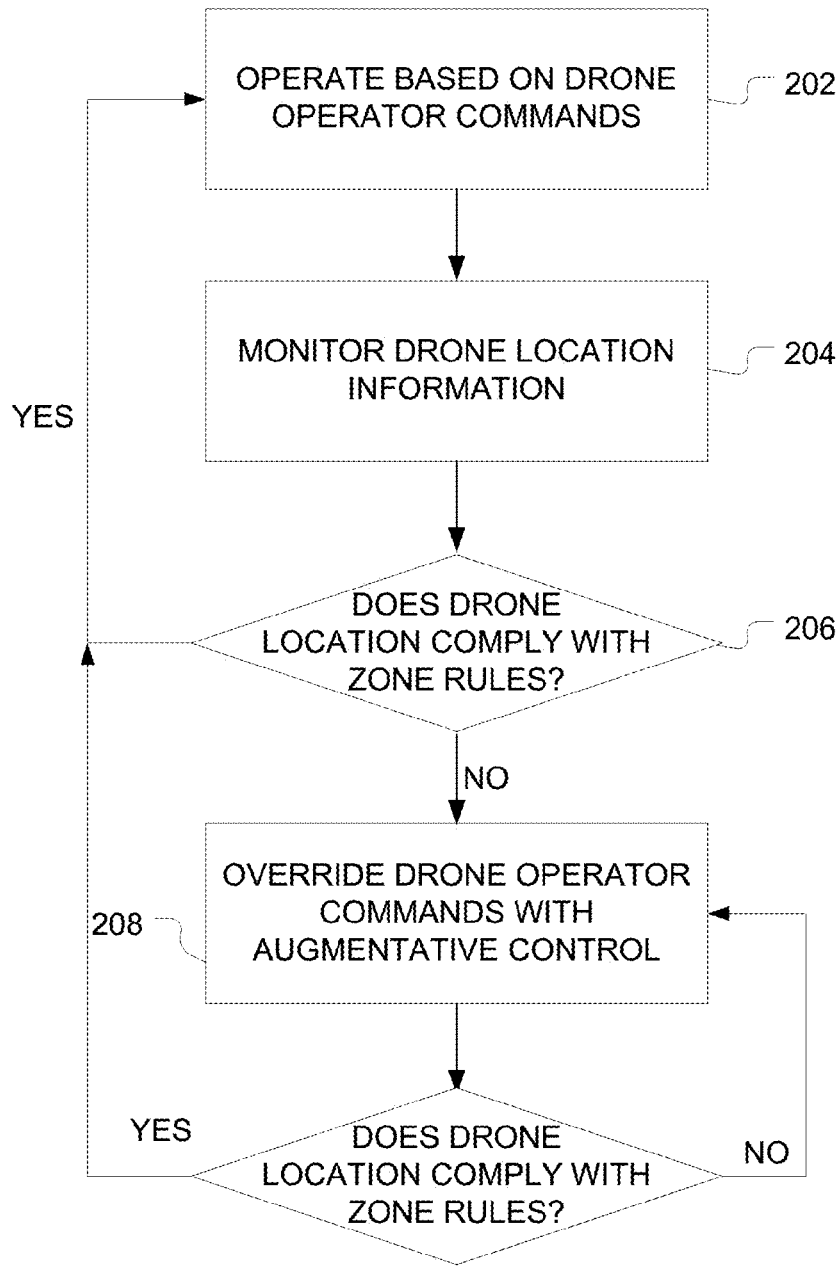
FIG. 2A is a flowchart of an exemplary method for control of an unmanned vehicle.

FIG. 1 illustrates an example system 100, that may include one or more unmanned vehicles, such as a drone 102a and a drone 102b (generally, drone 102). Drone 102 may be any unmanned vehicle, whether autonomous or remotely controlled by one or more persons. One or more functions of drone 102 may be controlled by drone operator controller. A drone operator controller may be one or more of a person, hardware, or software that controls normal operation of the drone. This may include directing a drone to take off, land, change velocity, change direction, and any other control functions. Drone 102 may also be associated with augmentative control, which may override drone operator controller under certain circumstances, such as based on monitoring drone 102 behavior or conditions. For example, if it is determined that drone 102 is about to crash due to low power levels, drone operator controller may be overridden to cause drone 102 to land. As another example, if drone 102 is about to exceed a specified altitude (such as the FAA's drone operation ceiling) based on drone operator controller commands, augmentative control may override such commands to keep (or return) drone 102 below the specified altitude.

Augmentative control may be used to restrict where and when drones 102 can fly. Augmentative control may include additional commands that may override normal operation when appropriate and authorized. Augmentative control may be applied to modify, cancel, or replace commands received from the drone operation controller. Augmentative control may be able to function regardless of whether drone 102 is within range or in communication with of any communication network. Augmentative control may be secured, such that only parties having authorized signatures (e.g., signing keys) can define airspace restrictions or other augmentative control commands. It may be desirable to be able to issue new augmentative commands to drone 102 in flight, even if the flight area is not within cell coverage. This may be advantageous when a new or emergency situation gives rise to new augmentative controls.

System 100 may include one or more zones, such as a zone 104a, a zone 104b, a zone 104c, or a zone 104d (generally, zone 104). Zone 104 may be defined by a two-dimensional geographic boundary on the surface of the Earth. In an aspect, zone 104 may be rectangular, and it may be defined by the tuple of the origin latitude, the origin longitude, the length, the width, and the orientation. While zones 104 are illustrated as rectangles, zone 104 may be defined by another shape or boundary. Optionally, zone 104 defined by a two-dimensional boundary may include the airspace directly above the two-dimensional boundary. For example, zone 104 may follow the ad coelom doctrine. Optionally, zone 104 may be defined by a three-dimensional boundary. For example, the three-dimensional boundary may limit the boundaries of zone 104 to a specific range of airspace. For example, zone 104 may be the rectangular prism between 10 and 1000 feet above ground surface or sea level. A particular zone 104 may be of a particular type, or may have certain rules applicable to that zone.

For example, zone 104a may be a no-fly zone, in which no drones 102 may enter or fly within. A no-fly zone like zone 104a may be used to prevent drones 102 from flying above or near an airport or other sensitive area.

As another example, zone 104b may be a geofence. Once drone 102b is within zone 104b, it may not be permitted to fly outside zone 104b. For example, a person operating the drone 102b may wish to ensure that drone 102b does not fly outside of the real property of the person.

Another example of a zone type is a customizable zone 104c. The rules applicable to a specific zone 104c may be customized. For example, the rules of zone 104c may permit drones 102 to fly within zone 104c during certain times, weather conditions, days, or other conditions. As another example, the rules of zone 104c may limit the maximum number of drones 102 that may operate within zone 104c at a given time. For example, zone 104c may be a temporary no-fly zone, such as one covering a planned presidential motorcade route.

Generally, the boundaries of zones 104 may be static. According to another aspect, the boundaries of zone 104 may be dynamic. For example, the boundaries of an object-defined zone may be a function of a current location of a object 106. In an example, object 106 may be broadly defined as any being or thing that moves, including but not limited to a mobile device, a vehicle (including another drone 102), a person, or the like. As object 106 moves, the boundaries of zone 104d move. For example, the boundaries of zone 104d may be a square centered on object 106. If object 105 moves 200 yards west, the boundaries of zone 104d also move 200 yards west. In one application, zone 104c with dynamic boundaries may be used to create a no-fly zone around a particular drone 102 to force that drone 102 to land.

Zones 104 may be communicated to drones 102 via a distributed agreement protocol. Any device, such as a zone declaration device 108, drone 102, or object 106, (generally, system device 110), may transmit a zone declaration via one or more of a cellular network 112 or a wireless network 114. One or more of cellular network 112 or wireless network 114 may include some or all of the functionality described below with respect to FIGS. 4-10. Wireless network 114 may comprise an ad-hoc network or mesh network, such as a network created by or connecting drones one or more of drones 102, object 106, zone declaration device 108, or system device 110 to one another.

Zone declarations may inform drones 102 of zones 104 currently in force nearby the respective drone 102. If drone 102 receives a zone declaration message (such as from system device 110) that identifies a particular zone 104 of which drone 102 was unaware, drone 102 may issue a zone information request (such as to system device 110). In response, drone 102 may receive zone information, such as the boundaries and rules of a particular zone 104. Through this protocol, drones 102 within system 100 will come to agree on the current set of zones 104 in system 100.

When drone 102 receives a zone declaration, drone 102 may check the digital signature of zone 104 indicated by or contained in the zone declaration to ensure that that zone 104 is authorized. In this manner, while any system device 110 may communicate zone declarations, only authorized key holders can create zones 104. Similarly, zone deletions may be communicated to drones 102. When drone 102 receives a zone deletion, drone 102 may check the digital signature indicated by or contained in the zone declaration to ensure that deletion of that zone 104 is authorized. An example of entities that are authorized to create or delete zones 104 include governmental agencies, like the FAA and the Secret Service.

FIG. 2A is a flowchart of an exemplary method 200 for control of an unmanned vehicle, such as drone 102 that includes augmentative control based on zones 104. At step 202, drone 102 may operate based on operator commands. Step 202 may include drone 102 receiving commands from a remote pilot (e.g., a person or a remote program) and executing operations based on those commands. In another aspect, step 202 may include drone 102 operating based on onboard software. Generally, step 202 may encompass normal operation of drone 102.

At step 204, method 200 may include monitoring location information of drone 102. Location information may include indicators of the current actual or relative location of drone 102. Location information may include indicators of a predicted future location of drone 102. Future locations of drone 102 may be correlated to a time at which drone 102 may be expected to be at that particular future location. A future location may include a location predicted or identified based on an actual flight path of drone 102. A flight plan may be defined by or determined by comparing a current location of drone 102 to a waypoint or endpoint. The flight path may include ray segments connecting the location of drone 102 to the next way point. For example, the planned flight path of drone 102 may be determined based on operator commands. Future location of drone 102 may also be determined based on new operator commands received at step 202. In another aspect, a predicted future location of drone may be based on current operating and environmental conditions, such as the velocity of drone 102, wind speeds, or the like.

At step 206, method 200 includes determining whether the drone location information received or determined in step 204 complies with zone rules. That is, step 206 determines whether drone 102 is currently violating or will be violating one or more of zones 104. A current or future violation of the rules may include determining that drone 102 is or will be entering zone 104 in which drone 102 is not authorized to be, fly, or operate. For example, this may be determined based on a ray segment connecting drone 102 to the next waypoint on its flight path to a boundary of zone 104. A current or future violation of the rules may include determining that drone 102 is outside of or will be outside of a geofence style zone (e.g., zone 104*b*) in which drone 102 is authorized to operate. If at step 206 it is determined that drone 102 is not currently violating any zone-based operating rules or that drone is not expected to be violating any zone-based operating rules based on future location information of drone 102, then method 200 returns to step 202.

If at step 206 it is determined that drone 102 is not or will not be complying with zone rules, then method 200 proceeds to step 208. At step 208, drone operator commands of step 202 will be overridden by augmentative control commands. The augmentative control commands may be based on location information or operating conditions of drone 102. Optionally, the augmentative control commands may be based on or derived from zone information associated with zone 104 that is associated with the zone rules of step 206. Augmentative control may include diverting drone 102*a*, altering its flight path, causing drone 102*a* to hover, grounding, or otherwise disabling drone 102*a*.

In one example, it may be determined that drone 102*a* will enter no-fly zone 104*a*. In an aspect, method 200 may use a graph algorithm to suggest a modification to the flight plan Optionally, if no modification exists that would allow drone 102*a* to avoid zone 104*a*, the augmentative control may comprise causing drone 102*a* to hover (e.g., above the ground) or land. In an aspect, grounding drone 102*a* may be used to deal with drone 102*a* only if drone 102*a* is within a certain range of (or within) zone 104*a*. Particular zone 104*a* may define how certain circumstances may be handled. For example, if a particular geographic area is very sensitive, augmentative control may immediately ground any drones 102 within the zone 104 associated with that geographic area. As another example, certain zones 104 may only require that augmentative control immediately direct drone 102 out of the zone 104 using the shortest flight path.

In another example, it may be determined that drone 102*b* operating within geofence zone 104*b* is or will currently be crossing the boundaries of zone 104*b*, leaving the permissible operating zone. Augmentative controls may alter the course of drone 102*b* to keep drone 102*b* within zone 104*b*. Optionally, augmentative controls may cause drone 102*b* to hover or ground within zone 104*b*.

Figure 2B:
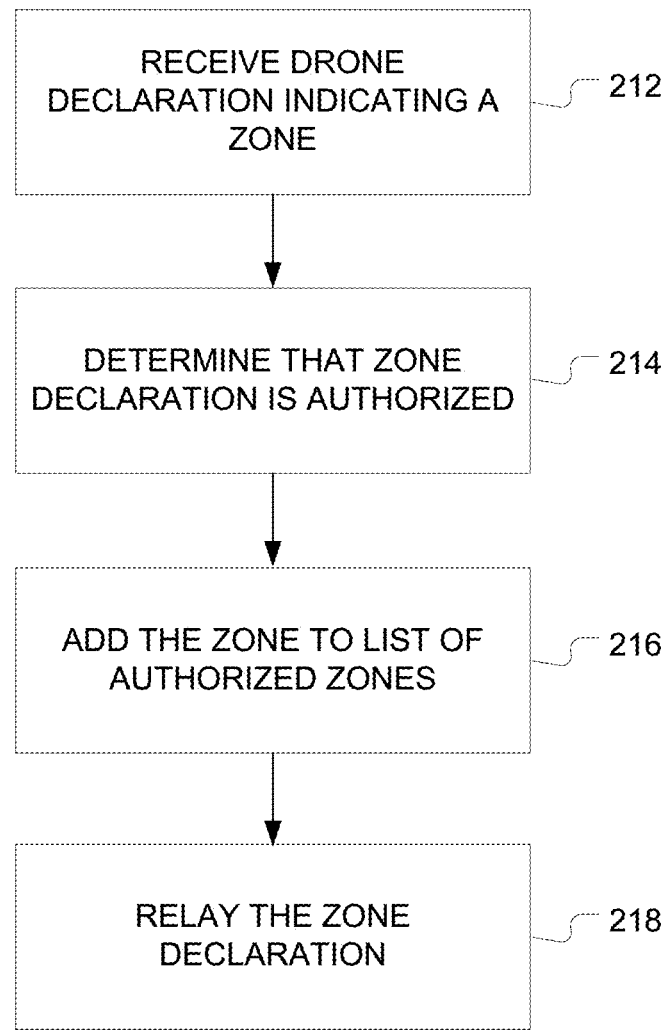
FIG. 2B is a flowchart of an exemplary method for declaring zones.

FIG. 2B illustrates a method 210 that may be used for communicating or tracking zone declarations. At step 212, method 210 may include drone 102 receiving a zone declaration indicating zone 104. Drone 102 may be connected to cellular network 112 or another wireless network 114. For example, wireless network 114 may comprise an ad hoc network containing one or more WiFi-capable devices, such as one or more other drones 102. Optionally, the packets of zone declaration may be received via either cellular network 112, wireless network 114, or a both. The network(s) through which drone 102 receives a zone declaration may depend upon whether drone 104 is in cell coverage (e.g., connected to cellular network 112) or whether drone 102 has ad hoc WiFi capability. A zone declaration received via cellular network 112 may use a cellular data link (e.g., LTE) to connect drone 102 to a systems device 110, such as a georouter resident on the Internet. A zone declaration received via wireless network 114 may use WiFi devices in ad hoc mode (IEEE 802.11 IBSS Mode). If drone 102 lacks functionality (e.g., software, hardware, or connectivity) to receive zone declarations from one or the other of cellular network 112 or wireless network 114, it may seamlessly operate in single tier use (e.g., using one type of network connectivity, like LTE connectivity) and still receive zone declarations.

A zone declaration may have a signature or indicate the creator of zone 104. At step 214, method 210 may include determine whether the zone declaration is authorized. This may be accomplished by confirming the signature of the zone declaration is an authentic digital signature. For example, a list of known parties may be complied, and their digital signatures kept in a list. Such known parties may include law enforcement and other governmental or regulatory parties, such as the FAA or the Secret Service.

If it is determined that the zone declaration is authorized or valid, at step 216 drone 102 may add zone 104 indicated by the zone declaration to a list of known zones. This may be used by augmentative control to override normal operation of drone 102, as discussed above.

At step 218, drone 102 may relay the zone declaration. Drone 102 may relay, or transmit, the zone declaration over one or more networks to which drone 102 is connected, such as cellular network 112 or wireless network 114. In this manner, when drone 102 received zone declaration 212, it may be receiving it from another drone 102*a* in the area. This may be useful if drone 102*a* is only connected to an ad hoc wireless network 114 and could not receive zone declarations transmitted via cellular network 112. Further, as different drones 102 enter different ad hoc wireless networks 112, it may pass along this information the zone declarations. In an aspect, a drone connected to both cellular network 112 and wireless network 114 could orbit higher altitudes where cellular coverage is inadequate and relay zone declarations to other drones 112.

Drone 102 may receive a second zone declaration indicating that one or more zones 104 have been deleted. In an aspect, method 210 may include repeating steps 212 through 218. Under this circumstances, step 216 may include updating the list by removing zone 104 indicated by the second zone declaration.

Relaying zone declarations may make use of geographic addressing. In a geographic-addressing network, packets are addressed to system devices 110 in a specified subset of space, such as a circle defined by the latitude and longitude of its center point, and a radius (e.g., in meters). This allows addressing zone declarations and other messages to particular system devices 110 based on their location, without knowing in advance the exact location of system devices 110. For example, to support an airspace awareness display, a query may be sent to system devices 110 in the area of interest, without knowing if any such system devices 110 exist in the area of interest. Providing geographic addressing and routing capability at the network level can solve this problem. This geographic addressing may be provided as a service to applications, such as those on one or more systems devices 110. In this manner, relaying via an ad hoc WiFi capability may use geographic addressing, rather than using the one-to-many broadcasts or multicasts at the physical layer.

Airspace awareness may be accomplished using geographic addressing, which solves the general problem of querying system devices 110 in an area for information, such as their presence and/or location. Optionally, the FCOP protocol may be used to accomplish this. This information may also be used in other techniques, such as collision avoidance. Airspace awareness may indicate location and optionally, other information received from system devices 110, as well as the age of such location information and other information. Geographic addressing may use an awareness display that not only indicates location information received from system devices 110, but also the age of such information. This may be accomplished, for example, by changing the color of location information of drones on a map as a function of time.

Figure 3:
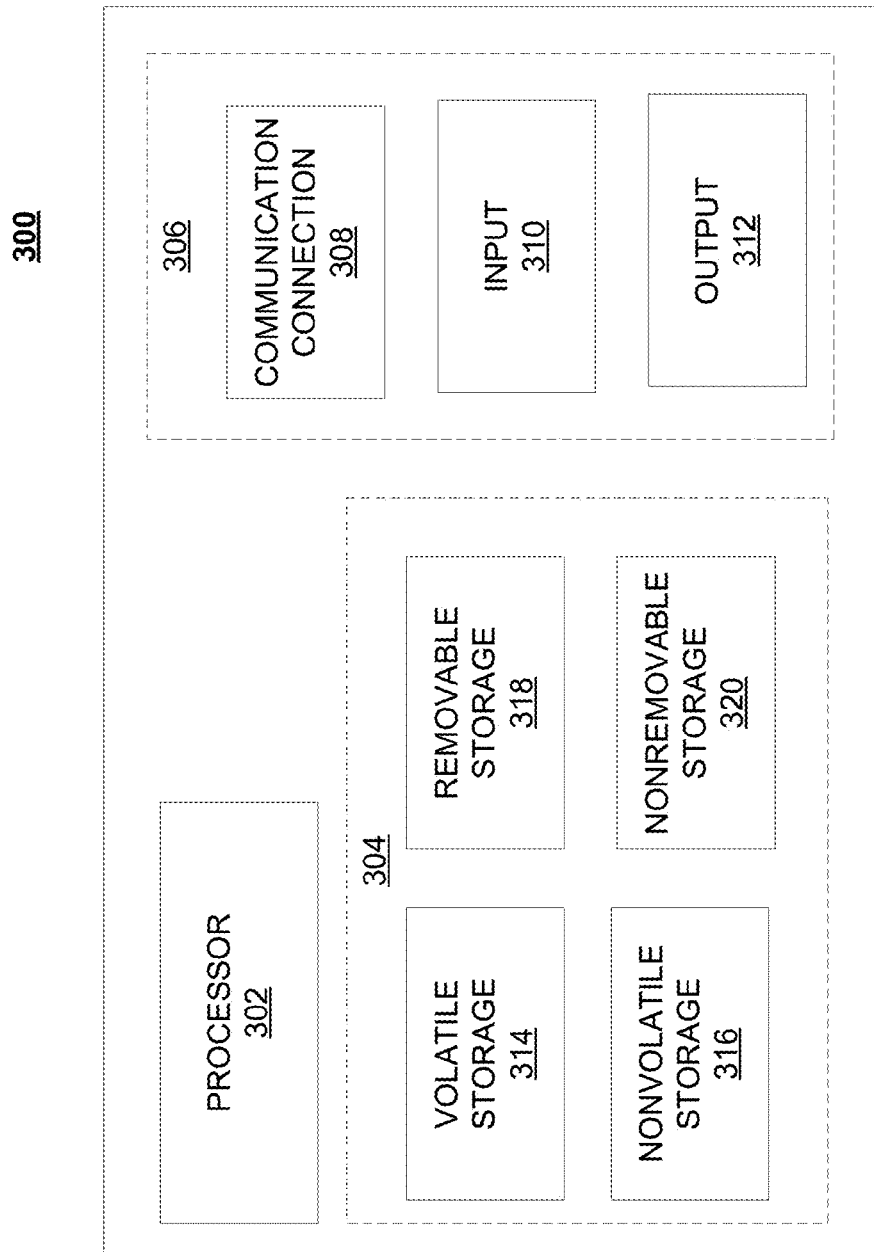
FIG. 3 is a schematic of an exemplary network device.

FIG. 3 is a block diagram of network device 300 that may be connected to or comprise a component of cellular network 112 or wireless network 114. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
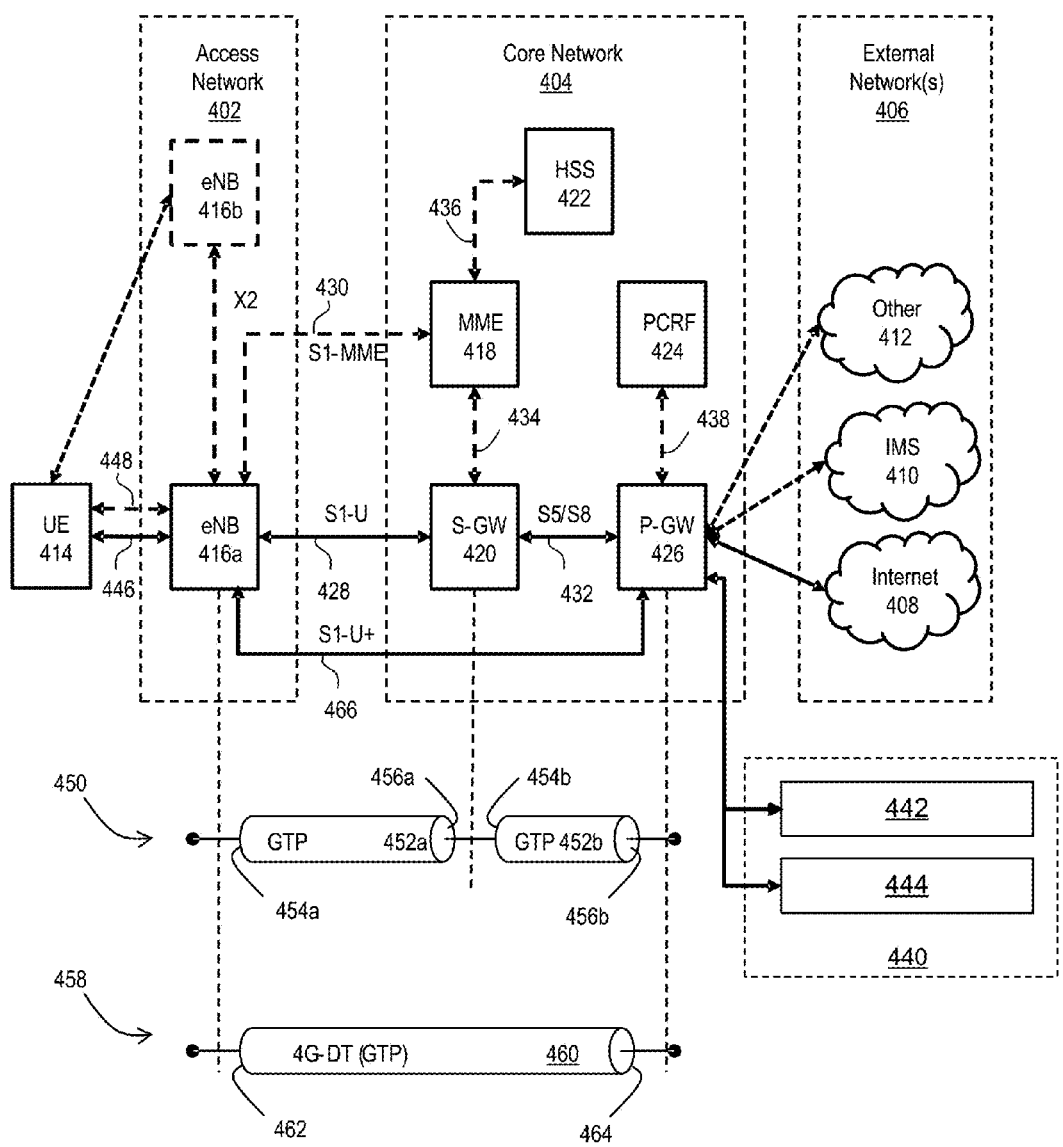
FIG. 4 depicts an exemplary communication system that provide wireless telecommunication services over wireless communication networks.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
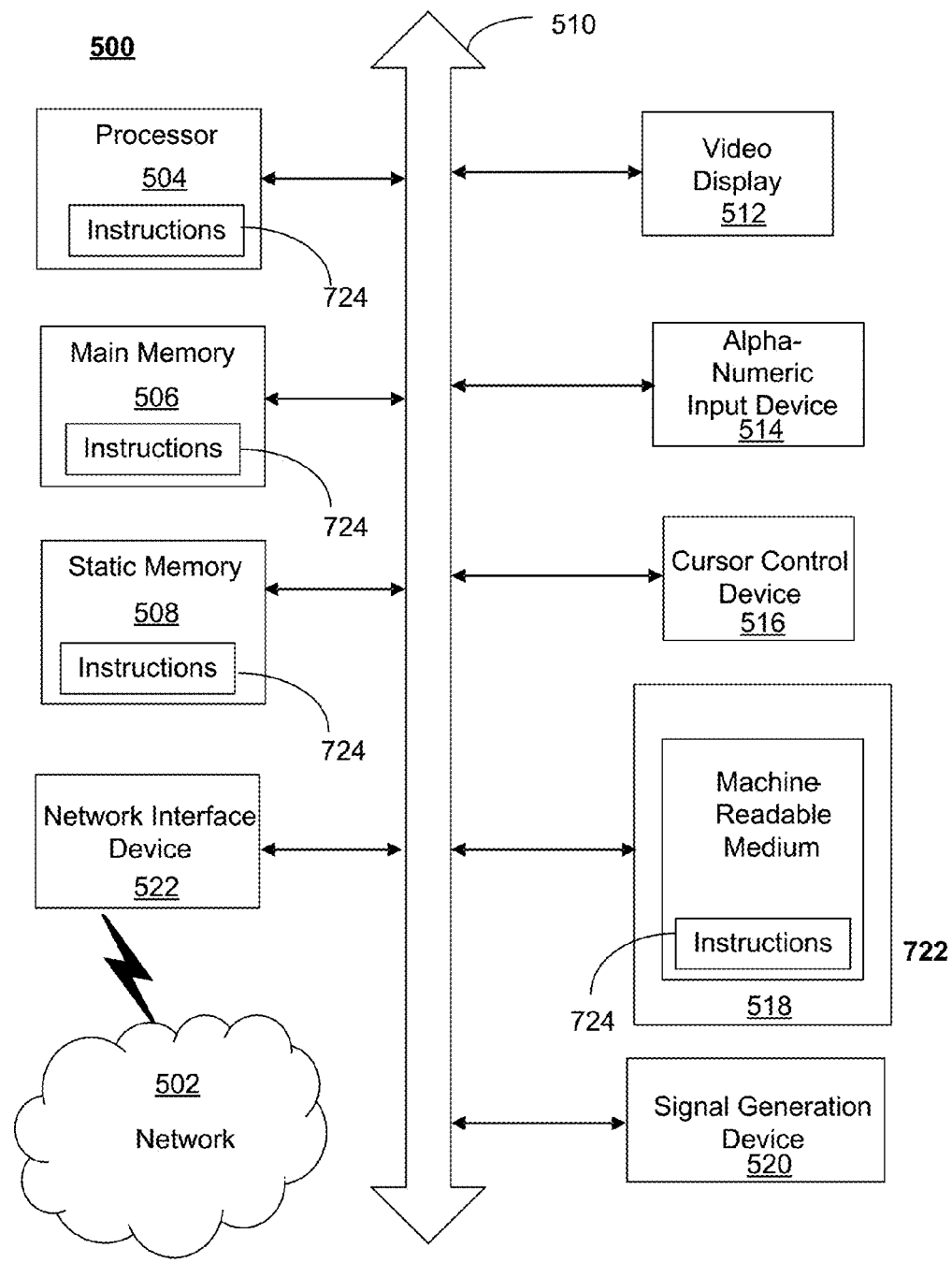
FIG. 5 depicts an exemplary communication system that provide wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine.

It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
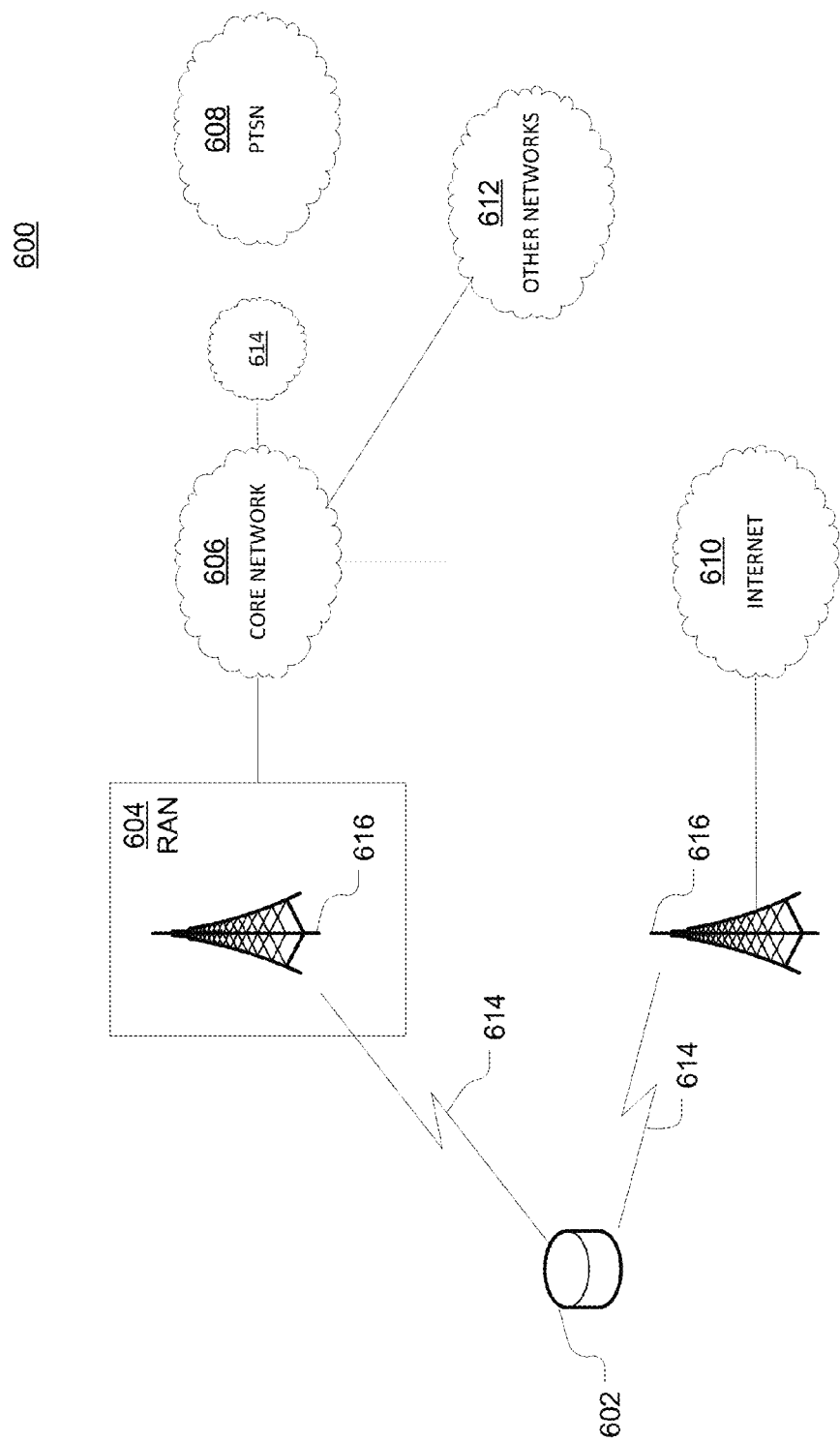
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
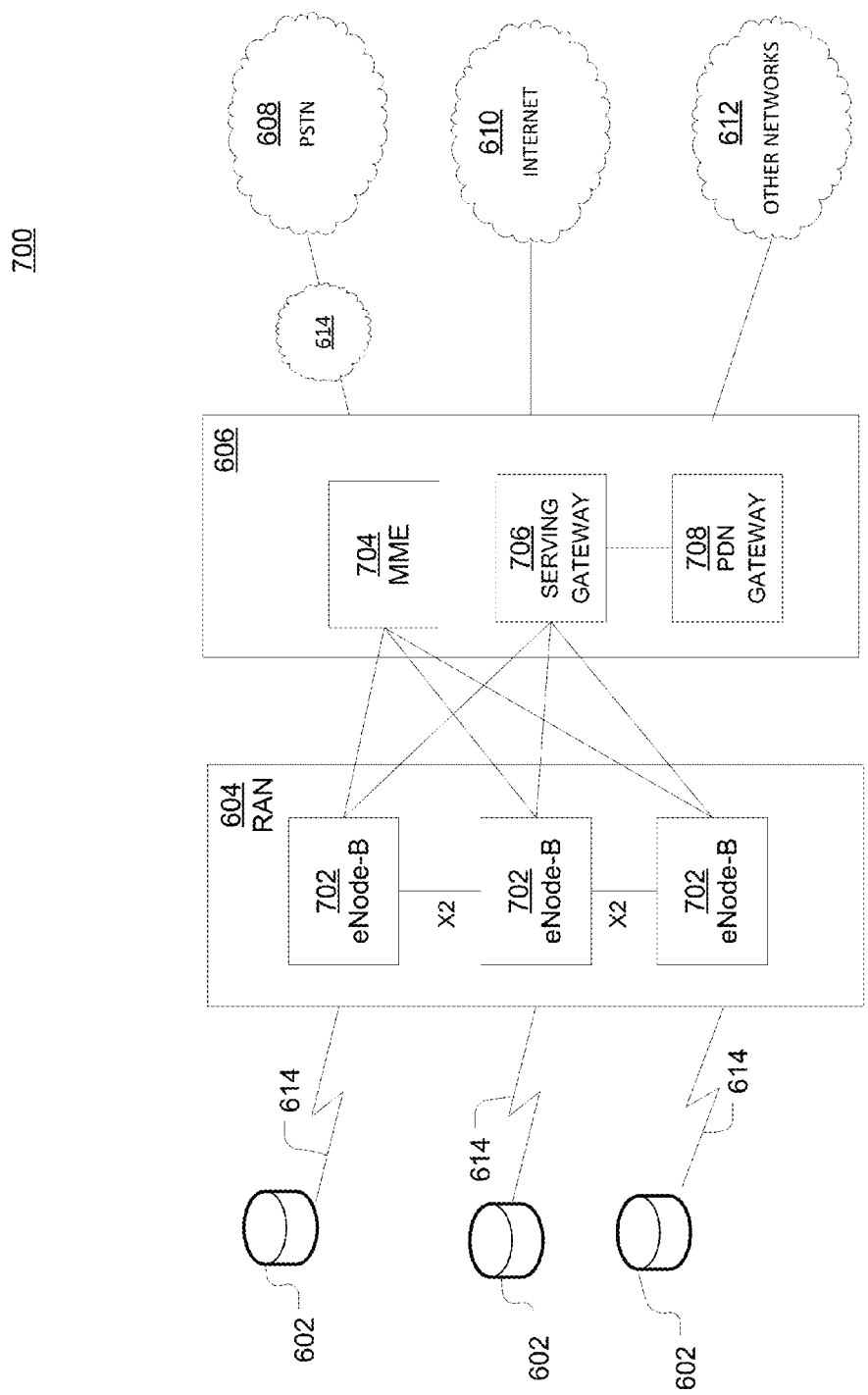
FIG. 7 is an example system diagram of a radio access network and a core network.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
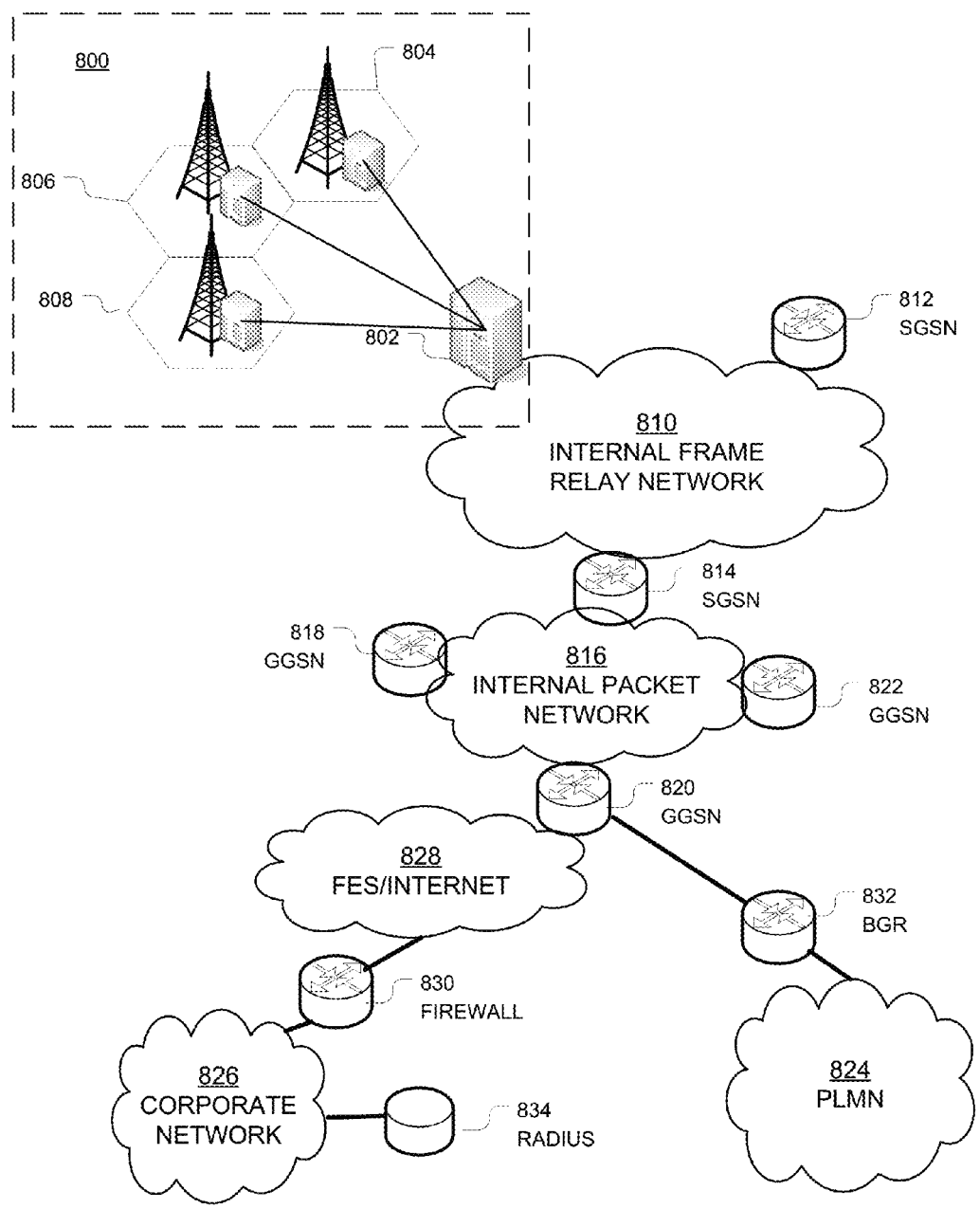
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
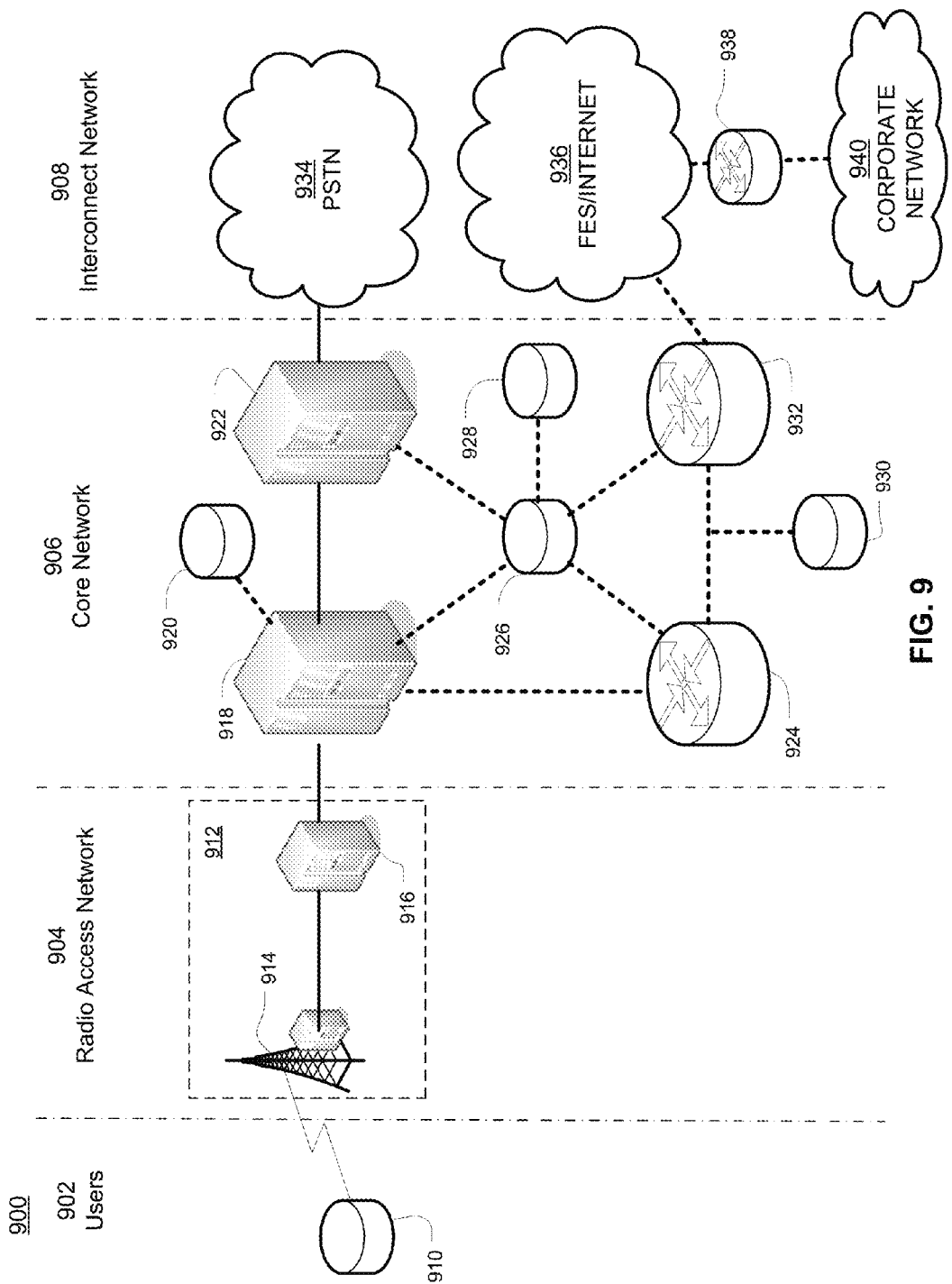
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
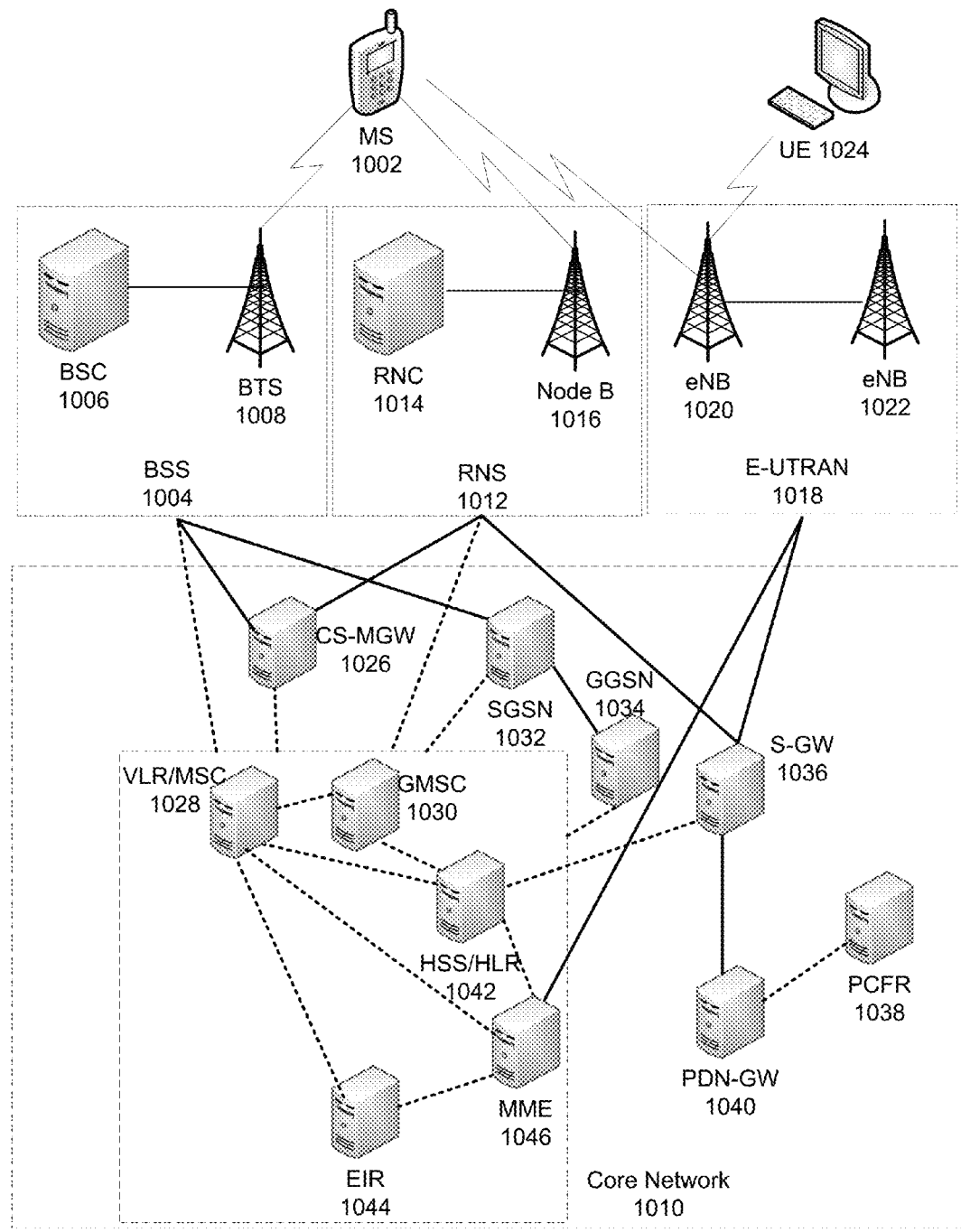
FIG. 10 is a block diagram of an exemplary public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
   receiving a zone declaration indicating a zone and a signature;
   determining that the zone comprises an authorized zone based on the signature being authorized;
   monitoring location information associated with a drone;
   comparing the location information with the authorized zone;
   based on the comparison, determining a violation by the drone of a rule associated with the authorized zone; and
   in response to the violation, augmenting control of the drone to alter operation of the drone,
   wherein the location information includes at least one of a current or predicted future location of the drone.

2. The method of claim 1, wherein the location information is based on at least a flight path of the drone.

3. The method of claim 2, wherein augmenting control comprises causing the drone to adjust the flight path.

4. The method of claim 1, wherein the operation of the drone is based on a drone operation controller, and augmenting the control comprises overriding the drone operation controller.

5. The method of claim 1, wherein comparing the location information with the authorized zone comprises identifying the authorized zone from a plurality of authorized zones based on a relative location of the authorized zone and the location information.

6. The method of claim 1, wherein augmenting control comprises causing the drone to hover.

7. The method of claim 1, wherein the authorized zone is indicated by a geographically addressed message.

8. A drone comprising:
   a processor; and
   memory communicatively coupled to the processor, the memory storing executable instructions that cause the processor to effectuate operations comprising:
   receiving a zone declaration indicating a zone and a signature;
   determining that the zone comprises an authorized zone based on the signature being authorized;
   operating flight of the drone using a drone operation controller;
   monitoring location information of the drone;
   comparing the location information with an authorized zone;
   based on the comparison, determining a violation by the drone of a rule associated with the authorized zone; and
   in response to the violation, overriding the drone operation controller to alter operation of the drone,
   wherein the location information includes at least one of a current or predicted future location of the drone.

9. The drone of claim 8, wherein the location information is based on at least a flight path of the drone, and wherein overriding the drone operation controller comprises altering the flight path.

10. The drone of claim 9, wherein the authorized zone is indicated by a geographically addressed message.

11. The drone of claim 8, wherein the zone declaration is received from a second drone.

12. The drone of claim 8, wherein comparing the location information with the authorized zone comprises identifying the authorized zone from a plurality of authorized zones based on a relative location of the authorized zone and the location information.

13. The drone of claim 8, wherein overriding the drone operation controller comprises causing the drone to hover.

14. A method comprising:
   receiving, via a first network, a zone declaration, the zone declaration comprising a definition of a zone and a digital signature;
   determining that the zone declaration is authorized based on the digital signature indicating a known party;
   adding the zone to a list of authorized zones; and
   relaying the zone declaration via a second network, wherein the second network differs from the first network.

15. The method of claim 14, wherein the second network is an ad-hoc Wi-Fi network comprising a drone.

16. The method of claim 14, further comprising: augmenting control of a drone based on the zone declaration.

17. The method of claim 14, further comprising:
receiving a second zone declaration comprising a deletion of the zone and a second digital signature;
determining that the second zone declaration is authorized based on the second digital signature;
removing the zone from the list of authorized zones; and
relaying the second zone declaration.

18. The method of claim 14, further comprising receiving a list of parties authorized to define zones, the list of parties indicating the known party.

* * * * *